United States Patent [19]
Barnes

[11] Patent Number: 5,816,348
[45] Date of Patent: Oct. 6, 1998

[54] HYDRAULIC DIRECTIONAL CONTROL DEVICE WITH SINGLE LEVER FOR VEHICLE

[75] Inventor: Ronald L. Barnes, Londonville, Ohio

[73] Assignee: Mannesmann Rexroth S.A., Venissieux, France

[21] Appl. No.: 842,816

[22] Filed: Apr. 17, 1997

[30] Foreign Application Priority Data

Apr. 18, 1996 [FR] France .................................. 96 04868

[51] Int. Cl.⁶ .................................................. B62D 6/00
[52] U.S. Cl. ........................ 180/6.2; 180/6.48; 180/333
[58] Field of Search .................................. 180/6.2, 6.48, 180/6.7, 333; 91/461

[56] References Cited

U.S. PATENT DOCUMENTS

| | | | |
|---|---|---|---|
| 3,530,951 | 9/1970 | Beig et al. ............................. | 180/333 |
| 4,076,090 | 2/1978 | Krusche et al. ...................... | 180/6.48 |
| 4,458,485 | 7/1984 | Seelmann ............................. | 180/6.48 |

FOREIGN PATENT DOCUMENTS

| | | |
|---|---|---|
| 0 040 381 | 11/1981 | European Pat. Off. . |
| 2 474 428 | 7/1981 | France . |
| 2824-448 | 12/1979 | Germany ............................... 180/6.48 |
| 3208-261 | 9/1982 | Germany ............................... 180/6.48 |
| 3212-361-A | 10/1983 | Germany ............................... 180/6.48 |
| 37 22 544 A1 | 1/1989 | Germany . |

*Primary Examiner*—Anne Marie Boehler
*Assistant Examiner*—Michael Cuff
*Attorney, Agent, or Firm*—Larson & Taylor

[57] ABSTRACT

Hydraulic device for directional control of a vehicle using a single lever, including: a hydraulic manipulator (1) with four outlets, forward-reverse and right-left; a selection device (4) with four selectors (5) in a bridge, which is connected to the manipulator and of which the outputs are connected to four directional drive controls, reverse-left, forward-left and reverse-right and forward-right for the running components of the vehicle; two slide valves (7) with two positions, respectively one with direct connections and one with crossed connections, which are inserted into the feed lines of the directional drive controls; first controls acting on a first end (8) of the slide valves being connected to the FORWARD or REVERSE outputs of the manipulator; and second controls acting on a second end (9) of the slide valves being connected to the RIGHT and LEFT outputs of the manipulator; by virtue of which the control of the vehicle remains fully ergonomic, including for a rotation of the vehicle on itself.

4 Claims, 4 Drawing Sheets

HYDRAULIC DIRECTIONAL CONTROL DEVICE WITH SINGLE LEVER FOR VEHICLE

The present invention relates to improvements made to hydraulic devices for directional control (forward, reverse, right, left) of a vehicle using a single control lever.

Referring to FIGS. 1 and 1A, a device of this type conventionally comprises a hydraulic manipulator 1 with four hydraulic outlets, respectively denoted AV for the forward movement control, AR for the reverse movement control, D for the right movement control and G for the left movement control. The manipulator 1 includes four hydraulic pressure reducers 3, respectively denoted 3 AV, 3 AR, 3 D and 3 G, the outputs of which constitute the four above-mentioned outlets of the manipulator 1 and which are furthermore connected to a common pressurized-fluid input P and a common return-to-reservoir output T. The four reducers 3 are arranged in a cross, associated in pairs with two substantially perpendicular directions FORWARD-REVERSE and RIGHT-LEFT, and are in general operated mechanically, via respective sliding tappets (not shown), with the aid of a component such as a single oscillating cam (not shown), to which a single actuation lever 2 is attached (FIG. 1A).

In order to constitute a safety measure against uncontrolled movement of the vehicle if the lever is accidentally struck while it is in the resting position, the four pressure reducers remain in the closed state so long as the component (and the lever associated with it) is moved (forwards or backwards and/or to the left or to the right) while remaining below predetermined respective thresholds of amplitude of movement forwards or backwards (or inhibiting thresholds). In other words, the outputs of the pressure reducers do not deliver a pressure signal so long as the lever remains in the hatched region straddling the direction GD, as schematically represented in FIG. 1A.

To give a concrete example, the two pressure reducers 3G and 3D are of the proportional type with an output pressure adjustable continuously from 0 to a maximum pressure (for example 20 bar); the two pressure reducers 3 AV and 3 AR may be of the proportional type with an output pressure adjustable continuously from a minimum pressure to a maximum pressure (for example from 6 to 20 bar) as soon as the lever has exceeded the abovementioned predetermined threshold, or they may be of the "all or nothing" or "open-closed" type and deliver only the maximum pressure (for example 20 bar) as soon as the lever has exceeded the abovementioned predetermined threshold.

A selection device 4 is functionally associated with the manipulator 1 and includes four selectors 5 arranged in a bridge, the pairwise opposite vertices of which are respectively connected to the four outlets AV and AR, on the one hand, and D and G, on the other hand, of the manipulator. The four selectors are respectively denoted by 5 AVG, 5AVD, 5ARG and 5ARD (FIG. 1).

In the conventional set-up usually adopted to date, the respective outputs of the four selectors 5 are connected directly to the directional drive controls 6 of the vehicle, which are denoted respectively by 6 ARG, 6AVG for the left running-component control, and 6ARD, 6AVD for the right running-component control, as represented in FIG. 1.

The manipulator is installed ergonomically in the vehicle, that is to say the movement of the actuation lever 2 coincides with the direction of movement desired for the vehicle: the AV–AR movement direction of the lever 2 coincides approximately with the longitudinal axis of the vehicle, and the D–G direction coincides approximately with the transverse axis of the vehicle.

However, a directional control thus arranged according to the prior art does not allow control of a pure rotation of the vehicle on itself. Indeed, such pure rotation of the vehicle on itself (or counter-rotation) without forward or reverse movement should be controlled by movement of the lever 2 in just the G direction, for a counter-rotation to the left, or in just the D direction, for a counter-rotation to the right.

However, referring to the hydraulic diagram in FIG. 1, it is seen that moving the lever 2, for example to the left, at the same time as forwards to overcome the inhibiting threshold, causes simultaneous opening of the three selectors 5 AVG, 5 ARD and 5 AVD. The selector 5 AVG delivers the output pressure of the pressure reducer 3 AV (assumed to be greater than the pressure of the reducer 3 G); the selector 5 ARG delivers the full output pressure of the pressure reducer 3 G; and the selector 5 AVD delivers the full output pressure of the pressure reducer 3 AV. The result of this is that the two controls 6 AVG and 6 AVD are fed simultaneously at the same pressure, while the control 6 ARG is fed when the control 6 ARD is not. The result of this is that the vehicle will move to the right (whereas the lever 2 was moved to the left), but without its movement being a rotation on itself because of the inequality of the feed pressures of the controls 6 ARG and 6 AVD and because of the simultaneous excitation of the control 6 AVG.

A similar drawback would also be obtained if the lever 2 were moved to the right.

The object of the invention is therefore essentially to propose a technical solution, which is purely hydraulic, capable of arranging that, if the actuation lever 2 is moved into a predetermined position to the left or to the right, and beyond the inhibiting threshold, two opposite controls 6 AVG–6 ARD or 6 AVD–6 ARG are excited on their own at the same pressure, and the vehicle then executes a pure rotation on itself, or counter-rotation, in the left or right direction corresponding to the left or right direction, respectively, of movement of the lever 2.

To this end, a hydraulic device for directional control (forward, reverse, right, left) of a vehicle using a single lever, is proposed, including:

a hydraulic manipulator with four hydraulic pressure reducers which are arranged in a cross while being associated in pairs to correspond respectively to the forward-reverse and left-right directions and which are actuated by a component (such as a single oscillating cam) to which a single actuation lever is attached, the four pressure reducers remaining in the closed state so long as the component is moved while remaining below respective predetermined thresholds for amplitude of movement forwards or backwards;

and a selection device with four selectors arranged in a bridge, two opposite vertices of which are joined to the respective outputs of the forward and reverse two pressure reducers, and two other opposite vertices of which are joined to the respective outputs of the right and left two pressure reducers, the outputs of the four selectors being in communication respectively with four directional drive controls, forward-left, reverse-left, forward-right and reverse-right, of the running components of the vehicle, which device, being arranged in accordance with the invention, is essentially characterized in that it includes:

two distribution slide valves with two functional positions, which are inserted between the selection device and the pairs of directional drive controls respectively for right and left, each slide valve having four inputs connected to the respective outputs of the four selectors in a bridge, and two outputs connected respectively to the two corresponding controls, first means for hydraulic control of each slide valve, which act on a first end of the slide valves in order to move the slide valves into a first functional position for which their two outputs are connected to two given inputs (direct-connection position), and second means for hydraulic control of each slide valve, which are connected to the left pressure reducer for the second slide valve, and to the right pressure reducer for the right slide valve, and which act on a second end of the slide valves, for moving the slide valves into a second functional position, for which their two outputs are connected to two other inputs (crossed-connection position), the said second means for hydraulic control of each slide valve being designed to be capable of a force which becomes greater than that developed by the abovementioned first means for hydraulic control of each slide valve when the lever is moved to the left or to the right beyond a predetermined position for which the left or right pressure reducer can generate a predetermined pressure.

By virtue of this arrangement, when the manipulator is moved to FORWARD or REVERSE beyond the abovementioned threshold, and optionally to RIGHT or LEFT, not as far as the abovementioned predetermined position, the second means for controlling the slide valves generate a smaller force than the first control means and the two slide valves are arranged, under the differential action of the abovementioned first and second control means, in a functional position with direct connections, with the FORWARD-LEFT and REVERSE-LEFT selectors connected respectively to the FORWARD-LEFT and REVERSE-LEFT directional drive controls through the left slide valve, and the FORWARD-RIGHT and REVERSE-RIGHT selectors connected respectively to the FORWARD-RIGHT and REVERSE-RIGHT directional drive controls through the right slide valve.

Conversely, when the manipulator is moved to FORWARD or REVERSE beyond the abovementioned threshold, while being furthermore moved to LEFT or RIGHT beyond the said predetermined position, the second means for control of the LEFT or RIGHT slide valve, respectively, generate a greater force than its first control means, and the LEFT or RIGHT slide valve, respectively, is arranged, under the differential action of the abovementioned first and second control means, in a functional position with crossed connections, so that the FORWARD-RIGHT and REVERSE-LEFT directional drive controls are fed, on their own and simultaneously, when the manipulator is moved to FORWARD-LEFT or REVERSE-RIGHT, the vehicle then turning on itself to the left, and so that the FORWARD-LEFT and REVERSE-RIGHT directional drive controls are fed, on their own and simultaneously, when the manipulator is moved to FORWARD-RIGHT or REVERSE-LEFT, the vehicle then turning on itself to the right.

Thus, by virtue of the inherent arrangements of the invention, and in spite of the presence of the inhibiting thresholds, it is possible to bring the lever 2 into positions which can control a rotation of the vehicle on itself, and furthermore in the left or right direction corresponding to the respectively left or right direction of movement of the lever.

Advantageously, the first means for hydraulic control of each slide valve comprise a fifth selector arranged between the outputs of the FORWARD and REVERSE two pressure reducers, and the output of the said fifth selector is connected to the said first end of the slide valves so that the pressure of the output fluid of the fifth selector is exerted on the surface of the said first end of the slide valves.

It is then possible to provide that each slide valve has a second end having a greater area than the said first end, and that the second means for hydraulic control of each slide valve consist of the surface of the said second end of the slide valve, on which the pressure of the output fluid of the LEFT or RIGHT reducer is exerted, respectively. However, to simplify manufacture of the slide valves, it is more economical to provide that each slide valve has a second end having an area substantially equal to that of the said first end, and that the second means for hydraulic control of each slide valve consist of the surface of the said second end of the slide valve, on which the pressure of the output fluid of the LEFT or RIGHT reducer is exerted, respectively, and of a compression spring bearing on the said second end of the slide valve.

The solution according to the invention is particularly beneficial because it employs an entirely hydraulic circuit, without any auxiliary control of electrical type; it uses only a small number of simple hydraulic components of conventional type; it is therefore inexpensive from the point of view of manufacturing, while providing an additional function which is useful for the user of the vehicle. Finally, the additional components which the invention employs can be grouped structurally with the selectors of the selector bridge in order to form a unitary assembly which is easy to fit, for example under the unit formed by the manipulator.

BRIEF DESCRIPTION OF THE DRAWINGS

The invention will be understood more clearly on reading the following detailed description of certain preferred embodiments which are given solely by way of purely illustrative example. In this description, reference is made to the appended drawings, in which.

Figure 1:
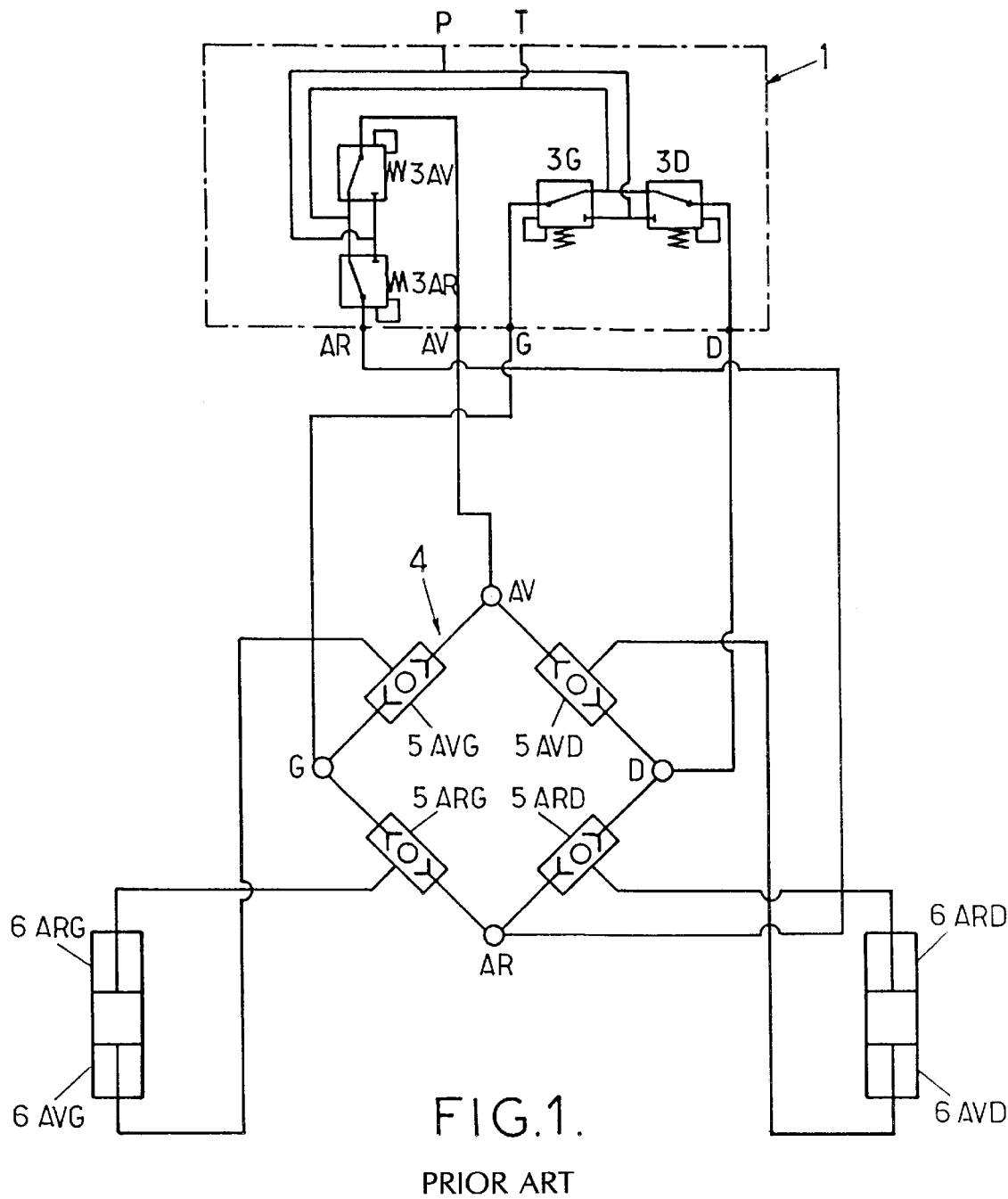
FIG. 1 is a diagram of a conventional hydraulic manipulator.
Figure 1A:
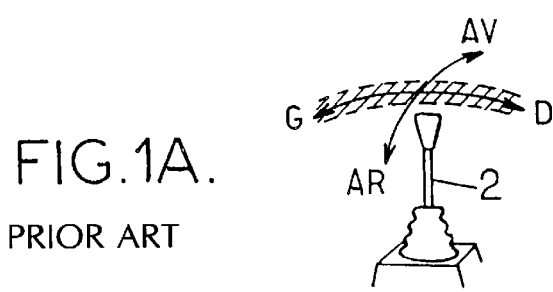
FIG. 1A is a single control lever.
Figure 2:
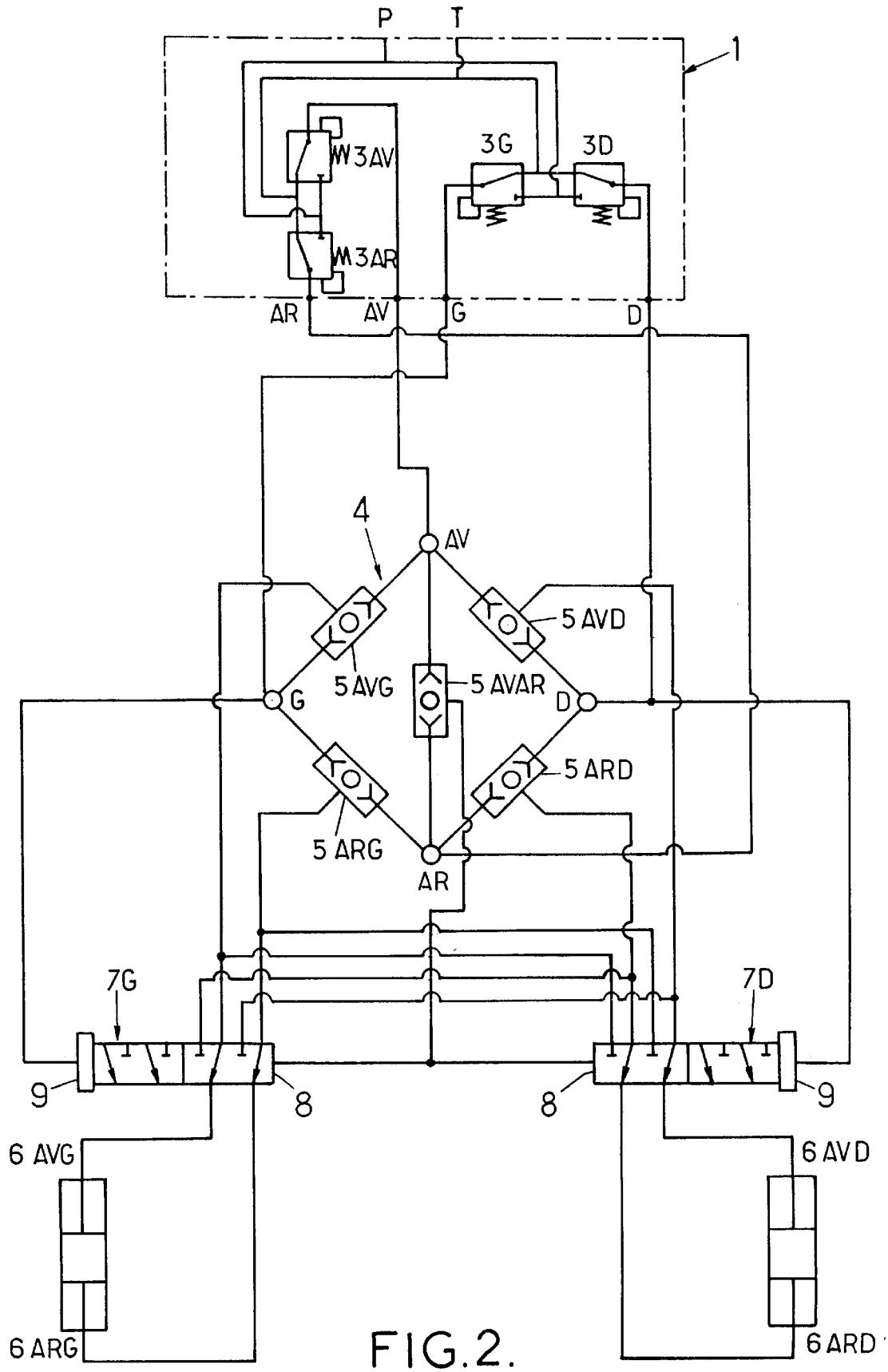
FIG. 2 is a hydraulic diagram of one advantageous embodiment of the invention, represented in a first functional position.

In the diagram in FIG. 2, the arrangements of the manipulator 1 and of the selector bridge 4 remain similar to the respective ones in FIG. 1.

The four respective outputs of the four selectors 5 are connected to four inputs of a first distribution slide valve 7 G with two positions, which as two outputs connected respectively to the inputs of the two directional drive controls 6 AVG and 6 ARG; the four respective outputs of the four selectors 5 are also connected to four inputs of a second distribution slide valve 7 D, with two positions, which has two outputs connected respectively to the inputs of the two directional drive controls 6 AVD and 6 ARD. In other words, the two left directional drive controls 6 AVG, 6 ARG and the two right directional drive controls 6 AVD and 6 ARD are fed from the selector bridge 4 through the two respective slide valves 7G and 7D.

Each slide valve 7 is designed to connect its two outputs to two different respective inputs in one and other of its two functional positions. In the position represented in FIG. 2, the two slide valves are in a functional position with direct connections: the slide valve 7 G then establishes a connection between the control 6 AVG and the selector 5 AVG and a connection between the control 6 ARG and the selector 5 ARG, while the slide valve 7 D establishes a connection between the control 6 AVD and the selector 5 AVD and a connection between the control 6 ARD and the selector 5 ARD. In other words, when the two slide valves 7 G and 7 D are in the direct-connection position shown in FIG. 2, the hydraulic diagram in FIG. 2 is functionally equivalent to the hydraulic diagram in FIG. 1, and moving the actuation lever 2 causes selective excitation of the directional drive controls, and therefore directional control of the vehicle, in the same way as in the case of the diagram in FIG. 1.

In order to change from one functional position to the other, each slide valve 7 is provided with first control means for bringing the slide valve into its direct-connection position represented in FIG. 2 (movement of the slide valve 7 G to the left and the slide valve 7 D to the right in FIG. 2) and with second control means for bringing the slide valve into its other functional position, or crossed-connection position, as will emerge further on (movement of the slide valve 7 G to the right end of the slide valve 7 D to the left in FIG. 2).

In a preferred embodiment, which can ensure correct and reliable operation of the device under all circumstances, including when the pressure delivered by the regulators 3 AV and 3 AR can vary continuously, the first means of control of the slide valves 7 G and 7 D comprise a fifth selector 5 AVAR, connected between the vertices AV and AR of the selector bridge 4, in other words between the respective outputs of the pressure regulators 3 AV and 3 AR of the manipulator 1. The output of the fifth selector 5 AVAR is connected to a first control input of the slide valves 7G, 7 D (right end for the slide valve 7 G and left end for the slide valve 7 D in FIG. 2), the surface of the first end of the slide valves 7 G, 7 D being subjected to the output pressure of the pressure regulators 3 AV or 3 AR through the fifth selector 5 AVAR.

In certain particular embodiments (for example if the output pressure of pressure regulator 3 AV or 3 AR is constant), the first means of control of the slide valves 7 G and 7 D may take a different form, for example return springs whose return force may be constant or adjustable.

Still in the embodiment represented in FIG. 2, the second means of control of each slide valve consist of the surface of the second end 9 of the slide valve (left end of the slide valve 7 G and right end of the slide valve 7 D in FIG. 2) which is connected to the output of the pressure reducer 3 G (or to the vertex G of the bridge 4) for the slide valve 7 G and to the output of the pressure reducer 3 D (or to the vertex D of the bridge 4) for the slide valve 7 D. The area of the end 9 of each slide valve is greater, in a ratio k, than the area of the end 8, so that the movement of each slide valve from its direct-connection position to the crossed-connection position is obtained for a pressure, on the end 9, which is smaller (in a ratio k) than that exerted on the end 8.

This asymmetry between the pressures for moving each slide valve in one or other direction is manifested, in the actuation lever 2, by the presence of a predetermined position of deflection to the left or to the right (and simultaneously forwards or backwards beyond the inhibiting threshold) for which position the output pressure of the reducer 3 G or 3 D of the manipulator 1 becomes k times greater than the output pressure of the reducer 3 AV or 3 AR, which is retransmitted by the fifth selector 5 AVAR. For example, the ratio k may be chosen in such a way that the change in position of a slide valve is obtained when the lever 2 is moved just beyond the limit of the inhibiting threshold forwards or backwards, while being pushed as far as possible to the left or to the right, depending on the direction desired for the counter-rotation of the vehicle.

Figure 2A:
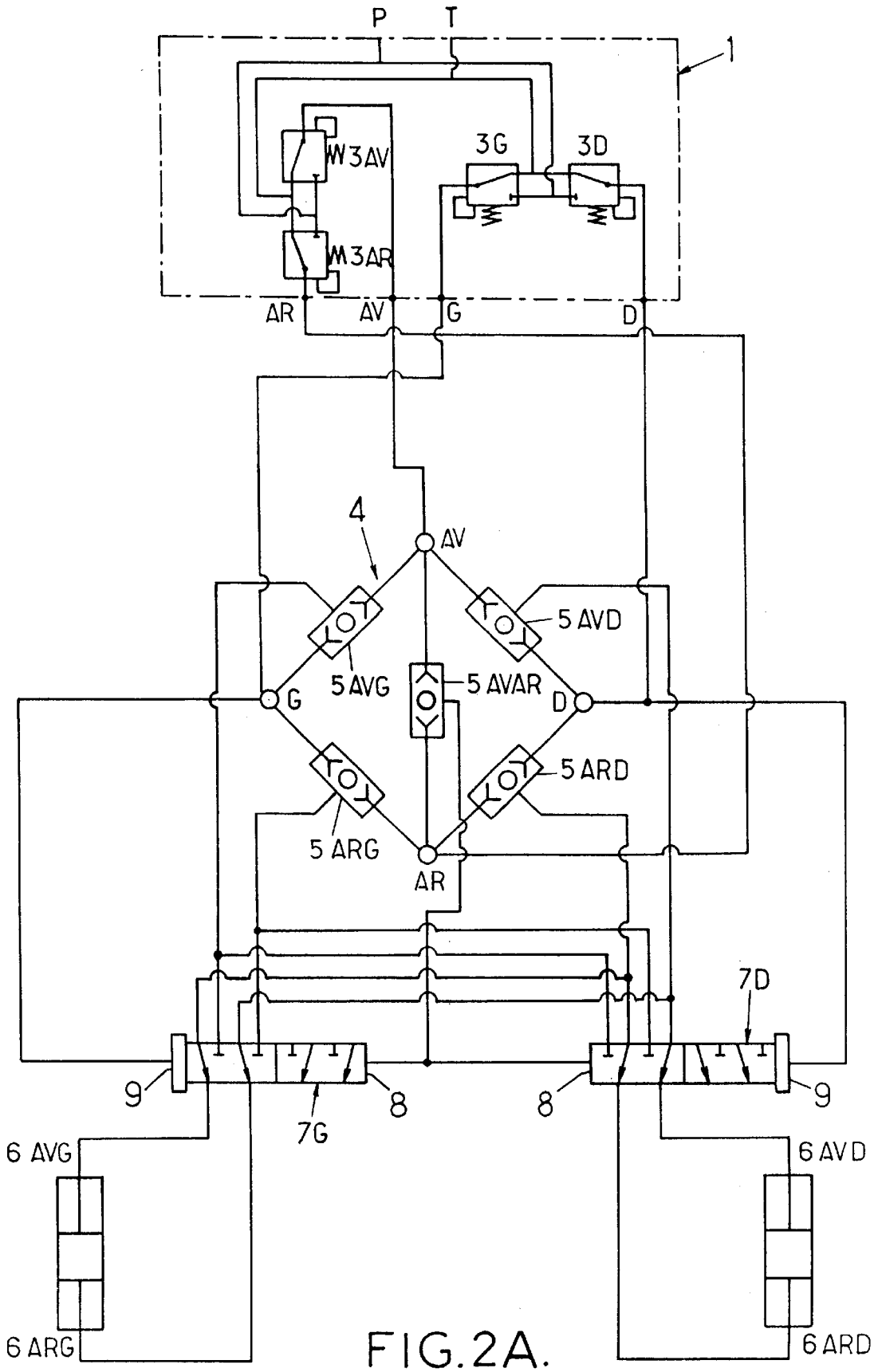
FIG. 2A is the hydraulic diagram of FIG. 2, shown in a second functional position.

FIG. 2A illustrates the example where the lever 2 has been moved forwards and to the left into a position which can cause, on the second end 9 of the slide valve 7 G, a pressure which is at least k times greater than the pressure of the reducer 3 AV, retransmitted by the fifth selector 5 AVAR onto the end 8 of the slide valve 7 G. Only the slide valve 7 G is moved since, with no signal appearing at the vertex D of the bridge 4, the slide valve 7 D remains subjected to the pressure of the reducer 3 AV, retransmitted by the fifth selector 5 AVAR onto its end 8.

Because of the inclination, forwards and to the left, given to the actuation lever of the manipulator, the selectors 5 AVD, 5 AVG and 5 ARG deliver signals on their respective outputs, with the selector 5 ARD delivering no signal.

The outputs of the selectors 5 AVG and 5 ARG are closed by the slide valve 7 G.

The output of the selector 5 ARD is connected, on the one hand, to the directional drive control 6 ARD through the slide valve 7 D and, on the other hand, to directional drive control 6 AVG through the slide valve 7 G: however, since the selector 5 ARG delivers no signal, the two directional drive controls 6 AVG and 6 ARD are not excited.

Finally, the selector 5 AVD delivers, on its output, the pressure present at the vertex AV of the bridge 4, or output pressure of the reducer 3 AV. The selector 5 AVD is connected, on the one hand, to the directional drive control 6 AVD through the slide valve 7 D and, on the other hand, to the directional drive control 6 ARG through the slide valve 7 G, which controls 6 AVD and 6 ARG are thus excited simultaneously, at the same pressure: the result of this is that the vehicle executes a rotation on itself, to the left, according to the inclination given to the lever 2.

An inclination of the lever 2 backwards and to the right would similarly lead to only the same two controls 6 AVD and 6 ARG being fed, and therefore to rotation of the vehicle on itself in the same direction, with the slide valve 7 G remaining in the direct-connection position and the slide valve 7 D being moved into the crossed-connection position.

It will similarly be understood that moving the lever 2 forwards and to the right, or alternatively backwards and to the left, would lead to only the controls 6 AVG and 6ARD being fed simultaneously, with a rotation of the vehicle on itself to the right.

The presence, on each slide valve 7, of two ends 8 and 9 having different areas introduces an asymmetry which makes the slide valves more complicated to manufacture, and more expensive.

Figure 3:
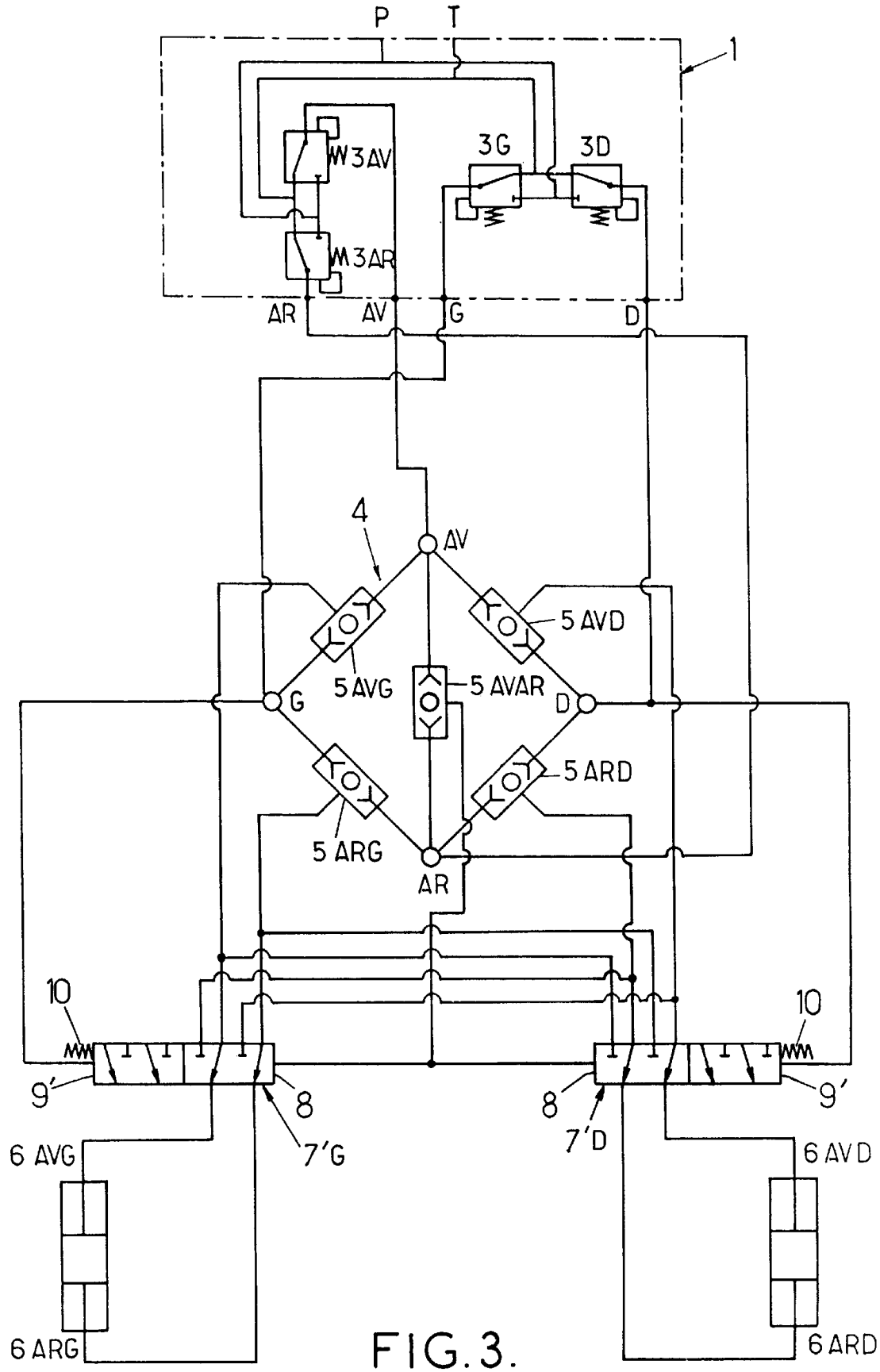
FIG. 3 is a hydraulic diagram of a variant of FIG. 2, which corresponds to a preferred embodiment of the invention.

In order to avoid this drawback it is possible, as represented in FIG. 3, to resort to perfectly symmetrical slide valves 7', with two ends 8, 9' which are identical and have the same area. Compression springs 10 are then added to the ends 9', these springs bearing on the said surfaces 9' and causing an asymmetry in the pressure thresholds leading to the slide valves being moved in one direction or the other. In other regards, the circuit in FIG. 3 operates in the same way as the circuit in FIG. 2.

As is self-evident, and as already results from the above discussion, the invention is in no way limited to those of its applications and embodiments which have been envisaged more particularly; on the contrary, it encompasses all variants thereof.

I claim:

1. Hydraulic device for directional control of a vehicle using a single lever, including:

a hydraulic manipulator (1) with four hydraulic pressure reducers (3) which are arranged in a cross while being associated in pairs to correspond respectively to the forward-reverse and left-right directions and which are actuated by a single actuation lever (2), the four pressure reducers (3) remaining in the closed state so long as the component is moved while remaining below respective predetermined thresholds for amplitude of movement forwards or backwards;

and a selection device (4) with four selectors (5) arranged in a bridge, two opposite vertices of which are joined to the respective outputs of the forward and reverse two pressure reducers, and two other opposite vertices of which are joined to the respective outputs of the right and left two pressure reducers, the outputs of the four selectors (5) being in communication respectively with four directional drive controls (6), forward-left, reverse-left, forward-right and reverse-right, of the running components of the vehicle, characterized in that it furthermore includes:

two distribution slide valves (7G, 7D) with two functional positions, which are inserted between the selection device (4) and the pairs of directional drive controls (6) respectively for right and left, each slide valve (7) having four inputs connected to the respective outputs of the four selectors (5) in a bridge, and two outputs connected respectively to the pairs of corresponding directional drive controls (6), first control means for hydraulic control of each slide valve, which act on a first end (8) of the slide valves in order to move the slide valves into a first functional position for which their two outputs are connected to two given inputs in a direct connection position, and second control means for hydraulic control of each slide valve, which are connected to the left pressure reducer for the left slide valve, and to the right pressure reducer for the right slide valve, and which act on a second end (9) of the slide valves, for moving the slide valves into a second functional position, for which their two outputs are connected to two other inputs in a crossed-connection position, the said second means for hydraulic control of each slide valve being designed to be capable of a force which becomes greater than that developed by the abovementioned first means for hydraulic control of each slide valve when the lever is moved to the left or to the right beyond a predetermined position for which the left or right pressure reducer can generate a predetermined pressure, by virtue of which, when the manipulator (1) is moved to FORWARD or REVERSE beyond the abovementioned threshold, not as far as the abovementioned predetermined position, the second control means for controlling the slide valves (7) generate a smaller force than the first control means and the two slide valves are arranged, under the differential action of the abovementioned first and second control means, in a functional position with direct connections, with the FORWARD-LEFT and REVERSE-LEFT selectors connected respectively to the FORWARD-LEFT and REVERSE-LEFT directional drive controls through the left slide valve, and the FORWARD-RIGHT and REVERSE-RIGHT selectors connected respectively to the FORWARD-RIGHT and REVERSE-RIGHT directional drive controls through the right slide valve, and, when the manipulator is moved to FORWARD or REVERSE beyond the abovementioned threshold, while being furthermore moved to LEFT or RIGHT beyond the said predetermined position, the second means for control of the LEFT or RIGHT slide valve, respectively, generate a greater force than its first control means, and the LEFT or RIGHT slide valve, respectively, is arranged, under the differential action of the abovementioned first and second control means, in a functional position with crossed connections, so that the FORWARD-RIGHT and REVERSE-LEFT directional drive controls are fed, on their own and simultaneously, when the manipulator is moved to FORWARD-LEFT or REVERSE-RIGHT, the vehicle then turning on itself to the left, and so that the FORWARD-LEFT and REVERSE-RIGHT directional drive controls are fed, on their own and simultaneously, when the manipulator is moved to FORWARD-RIGHT or REVERSE-LEFT, the vehicle then turning on itself to the right.

2. Device according to claim 1, characterized in that the first means for hydraulic control of each slide valve comprise a fifth selector (5 AVAR) arranged between the outputs of the FORWARD and REVERSE two pressure reducers (3), and in that the output of the said fifth selector is connected to the said first end (8) of the slide valves (7) so that the pressure of the output fluid of the fifth selector is exerted on the surface of the said first end of the slide valves.

3. Device according to claim 2, characterized in that each slide valve (7) has a second end (9) having a greater area than the said first end (8), and in that the second means for hydraulic control of each slide valve consist of the surface of the said second end of the slide valve, on which the pressure of the output fluid of the LEFT or RIGHT reducer is exerted, respectively.

4. Device according to claim 2, characterized in that each slide valve (7) has a second end (9') having an area substantially equal to that of the said first end (8), and in that the second means for hydraulic control of each slide valve consist of the surface of the said second end (9') of the slide valve, on which the pressure of the output fluid of the LEFT or RIGHT reducer is exerted, respectively, and by a compression spring (10) bearing on the said second end of the slide valve.

* * * * *